US012580889B2

(12) United States Patent
Heintel et al.

(10) Patent No.: US 12,580,889 B2
(45) Date of Patent: Mar. 17, 2026

(54) SPECIFIC USE OF A GATEWAY IN OPERATIONAL TECHNOLOGY NETWORKS

(71) Applicant: Triovega GmbH, Lübeck (DE)

(72) Inventors: Benedikt Heintel, Kirchhundem (DE); Alexander Luig, Eslohe (DE); Paul Romanczyk, Hagen (DE); Simon Walz, Braunschweig (DE); Clark Gaebel, Lübeck (DE); Dmitry Kazakov, Lübeck (DE)

(73) Assignee: Triovega GmbH, Lübeck (DE)

( * ) Notice: Subject to any disclaimer, the term of this patent is extended or adjusted under 35 U.S.C. 154(b) by 93 days.

(21) Appl. No.: 18/267,467

(22) PCT Filed: Dec. 13, 2021

(86) PCT No.: PCT/EP2021/085338
§ 371 (c)(1),
(2) Date: Jun. 15, 2023

(87) PCT Pub. No.: WO2022/128829
PCT Pub. Date: Jun. 23, 2022

(65) Prior Publication Data
US 2024/0056421 A1     Feb. 15, 2024

(30) Foreign Application Priority Data
Dec. 15, 2020     (DE) ..................... 10 2020 133 567.9

(51) Int. Cl.
*H04L 9/40* (2022.01)
*G05B 19/418* (2006.01)
(Continued)

(52) U.S. Cl.
CPC ...... *H04L 63/0245* (2013.01); *G05B 19/4185* (2013.01); *H04L 12/66* (2013.01);
(Continued)

(58) Field of Classification Search
CPC ............. H04L 63/0245; H04L 63/1408; H04L 63/1441; H04L 69/321; H04L 12/66;
(Continued)

(56) References Cited

U.S. PATENT DOCUMENTS

| | | | | |
|---|---|---|---|---|
| 8,220,038 | B1 * | 7/2012 | Lucchesi | ............ H04B 7/18508 |
| | | | | 726/4 |
| 10,739,745 | B1 * | 8/2020 | Kretschmann | ....... H05K 7/1464 |

(Continued)

FOREIGN PATENT DOCUMENTS

| | | |
|---|---|---|
| CN | 104460657 A | 3/2015 |
| CN | 104753936 A | 7/2015 |

(Continued)

OTHER PUBLICATIONS

Protokollstapel. In: Wikipedia, Die freie Enzyklopadie. Bearbeitungsstand: 18. I Jun. 2020, 20:21 UTC. URL: https://de.wikipedia.org/w/index.php? title=Protokollstapel&oldid=201100946 [abgerufen am Oct. 7, 2021] (English-language translation included, retrieved on Oct. 7, 2021).

*Primary Examiner* — Mohamed A. Wasel
(74) *Attorney, Agent, or Firm* — The Webb Law Firm

(57) ABSTRACT
The invention relates to an apparatus configured to receive an input message via the first interface. The input message having a first layer structure and containing an information piece associated with the top layer of the first layer structure, extracting the information piece from the input message by passing the input message through a protocol stack associated with the first layer structure from bottom to top, examining the extracted information piece to obtain an examination result, generating an output message by passing the extracted information piece or an information piece generated on the basis of the extracted information piece through a protocol stack associated with a second layer structure from top to bottom, and sending the output mes-
(Continued)

state of the art sage via the second interface. The generating and/or the sending of the output message are performed as a function of the examination result.

17 Claims, 6 Drawing Sheets

(51) Int. Cl.
  *H04L 12/66*         (2006.01)
  *H04L 69/321*        (2022.01)

(52) U.S. Cl.
  CPC ...... *H04L 63/0209* (2013.01); *H04L 63/1408* (2013.01); *H04L 63/1441* (2013.01); *H04L 69/321* (2013.01); *G05B 2219/31122* (2013.01); *G05B 2219/31369* (2013.01)

(58) Field of Classification Search
  CPC ...... G05B 19/4185; G05B 2219/31122; G05B 2219/31369
  See application file for complete search history.

(56)                References Cited

U.S. PATENT DOCUMENTS

| 10,824,588 | B2 * | 11/2020 | Ramamurthy .......... H04L 67/06 |
|---|---|---|---|
| 2013/0080903 | A1 * | 3/2013 | Barda ................. H04L 63/1441 |
| | | | 726/13 |
| 2015/0020152 | A1 | 1/2015 | Litichever et al. |
| 2015/0195249 | A1 | 7/2015 | Barda et al. |
| 2016/0147827 | A1 | 5/2016 | Diaconu et al. |
| 2017/0070507 | A1 | 3/2017 | Leconte et al. |
| 2017/0171220 | A1 | 6/2017 | Thomson et al. |

FOREIGN PATENT DOCUMENTS

| CN | 205670253 | U | 11/2016 |
|---|---|---|---|
| CN | 111917689 | A | 11/2020 |
| JP | 2014175828 | A | 9/2014 |
| KR | 101736223 | B1 | 5/2017 |
| WO | 20111151768 | A1 | 12/2011 |
| WO | 2017084535 | A1 | 5/2017 |

* cited by examiner

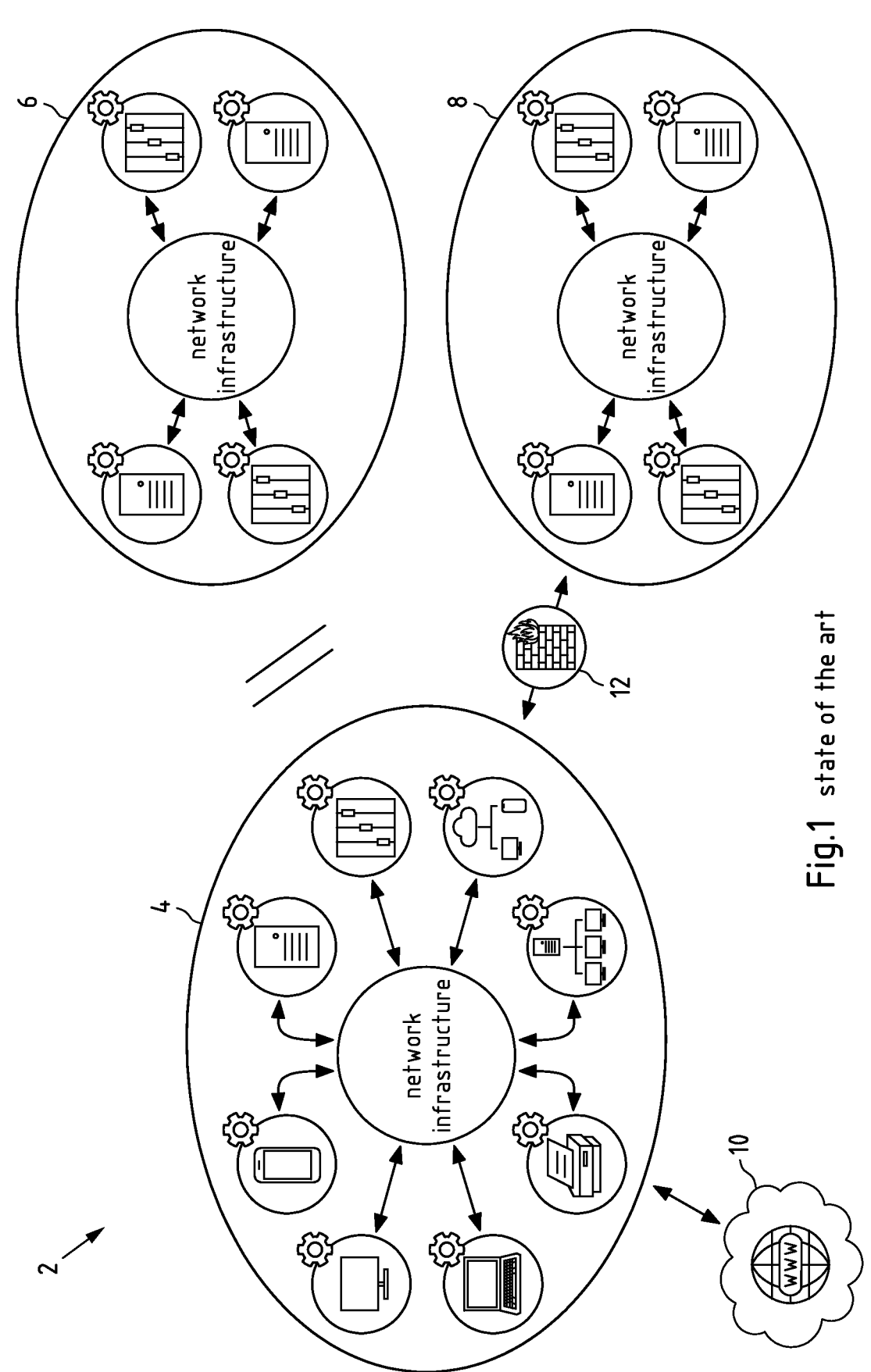
Fig.1 state of the art

SPECIFIC USE OF A GATEWAY IN OPERATIONAL TECHNOLOGY NETWORKS

CROSS-REFERENCE TO RELATED APPLICATIONS

This application is the United States national phase of International Application No. PCT/EP2021/085338 filed Dec. 13, 2021, and claims priority to German Patent Application No. 10 2020 133 567.9 filed Dec. 15, 2020, the disclosures of which are hereby incorporated by reference in their entireties.

BACKGROUND OF THE INVENTION

Field of the Invention

The invention relates to an apparatus comprising a first interface for communication with a first communication network and a second interface for communication with a second communication network separate from the first communication network. Further, the invention relates to a system comprising a first communication network, a second communication network separate from the first communication network, and the aforementioned apparatus. Furthermore, the invention relates to a method.

Description of Related Art

In production and industrial plants, hardware and software is used for open- and closed-loop controlling, monitoring and/or controlling machines, plants and processes. While this hardware and software, also referred to as operational technology (OT), used to be operated primarily in closed systems, today it is increasingly being connected to the company's IT infrastructure, which on the one hand offers various advantages such as a higher degree of automation or remote monitoring, remote control or remote maintenance, but on the other hand also poses new challenges such as incompatibilities of systems and protocols or increased vulnerability to cyber attacks.

This is made more difficult by the fact that the software and hardware used in a production or industrial plant often cannot be changed for reasons of compatibility or warranty. This means that it is not possible to install software or security updates, to deactivate communication interfaces that are not required, or to generally adjust the configuration of a large number of OT systems. Safeguarding the already identified vulnerabilities of an OT system of a production or industrial plant can thus only be carried out sporadically and after consultation with the respective manufacturer. In contrast, independent modification of the software and hardware can lead to a failure of the entire plant or a loss of warranty.

In the industrial environment, due to the original use of OT systems in an isolated environment, proprietary protocols are also frequently used, which are not suitable for communication in a heterogeneous and highly networked environment with different IT and OT systems. In order to enable communication nevertheless, middleware is increasingly being used, in particular so-called converters, which perform a translation of the protocols in the case of a direct connection. Although these converters enable communication between networks with different protocols, they make only a limited contribution to increasing security, for example against cyber attacks.

Against the background of an increasing integration of OT systems into the network infrastructures of IT systems, risks thus arise with regard to secure operation and a guarantee of the protection goals of availability, integrity and confidentiality of the integrated OT systems as well as for the correctness of the translation of data between different protocols with the aid of converters.

To reduce the risks that have arisen, the OT systems of a production or industrial plant are sometimes operated in isolated segments of the global network infrastructure. Such segmentation of the network infrastructure is often implemented with the help of a firewall system, which enables communication to be restricted to the protocols that are absolutely necessary for operation. In this way, security is increased, but in some cases not yet to the desired extent.

In addition, the manufacturers of the production and industrial plants design the OT hardware according to the planned control components and primarily take into account the control cycle of the operational production process, but not the specific software used by the customer to safeguard the systems. As a result, the hardware provided by the manufacturer often becomes very sluggish after the safety-related software has been installed, and the control software used no longer functions properly.

SUMMARY OF THE INVENTION

Against this background, the present invention is based on the object of providing a method, an apparatus and a system for securing networks, in particular OT networks, in a network infrastructure which may be heterogeneous and, for example, connected to the Internet.

According to the invention, this object is solved by a method carried out by at least one device, comprising at least the following steps:

receiving an input message via a first interface, wherein the input message has a first layer structure and contains an information piece associated with the top layer of the first layer structure, extracting the information piece from the input message by passing the input message through a protocol stack associated with the first layer structure from bottom to top, examining the extracted information piece to obtain an examination result, generating an output message by passing the extracted information piece or an information piece generated based on the extracted information piece through a protocol stack associated with a second layer structure from top to bottom; and sending the output message via a second interface, wherein the obtaining, in particular the generating, and/or the sending of the output message is performed as a function of the examination result.

When the information piece is extracted, the data to be communicated from the first to the second communication network, in particular process data, is decoded.

When the extracted information piece is examined, in particular an access control is performed at the application layer, i.e. the access to the second communication network based on the data to be communicated is controlled in particular at the application layer by examining the information piece at this layer.

When the output message is generated, the data to be communicated, in particular process data, is prepared, in particular into a communication protocol used within the second communication network, which can also be a fieldbus protocol, for example, as is frequently used in OT networks.

The first interface is an interface for communication with a first communication network. Accordingly, the first interface is preferably connected to a first communication network.

The second interface is an interface for communication with a second communication network separate from the first communication network. Accordingly, the second interface is preferably connected to a second communication network separate from the first communication network.

According to the invention, the above-named object is further solved by an apparatus comprising: a first interface for communicating with a first communication network, a second interface for communicating with a second communication network separate from the first communication network, at least one processor, and at least one memory containing computer program code, wherein the at least one memory and the computer program code are configured to cause, with the at least one processor, the apparatus to perform the previously described method or an embodiment thereof.

In particular, the above-named object is solved according to the invention by an apparatus comprising: a first interface for communicating with a first communication network, a second interface for communicating with a second communication network separate from the first communication network, at least one processor, and at least one memory containing computer program code, wherein the at least one memory and the computer program code are configured to cause, with the at least one processor, the apparatus to perform at least the following:

receiving an input message via the first interface, the input message having a first layer structure and containing an information piece associated with the top layer of the first layer structure, extracting the information piece from the input message by passing the input message through a protocol stack associated with the first layer structure from bottom to top, examining the extracted information piece to obtain a examination result, generating an output message by passing the extracted information piece or an information piece generated on the basis of the extracted information piece through a protocol stack associated with a second layer structure from top to bottom; and sending the output message via the second interface, wherein the generating and/or the sending of the output message are performed as a function of the examination result.

The input message is received in particular via the first interface of the apparatus. Furthermore, the output message is sent in particular via the second interface of the apparatus.

The at least one apparatus, by which the previously described method is carried out, is preferably the previously described apparatus or an embodiment thereof.

The above-named task is further solved according to the invention by a system comprising a first communication network, comprising a second communication network separate from the first communication network, and comprising the previously described apparatus or an embodiment thereof, wherein the first interface is connected to the first communication network and the second interface is connected to the second communication network.

The method, the apparatus, and the system each provide secure and reliable communication between two separate communication networks.

In particular, the method, the apparatus and the system can each achieve virtually complete decoupling of the necessary communication connections between two communication networks, in particular between two logically segmented network infrastructures of an IT and OT system, in particular between an IT network and an OT network. In this way, the operation of a production or industrial plant can be secured and the guarantee of the protection goals of availability, integrity and confidentiality can be made possible, in particular independently of the operating system used, of already known security vulnerabilities or of the services provided.

The apparatus comprises a first and a second interface for communication with a first and a second communication network, respectively. The first and/or second interface may in particular be an Ethernet interface. However, it is conceivable that at least one of the interfaces is set up for another data network technology, for example for a proprietary OT data network technology.

The input message has a first layer structure and contains an information piece assigned to the top layer of the first layer structure. A layer structure is understood to be the sequence of layers used according to the OSI reference model with their respective assigned protocols. The protocol stack assigned to a layer structure is accordingly the sequence of protocols used for the individual layers of the layer structure.

The top layer may in particular be the application layer according to the OSI reference model. The first layer structure has several layers according to the OSI reference model. In particular, the first layer structure can have all seven layers (physical layer, data link layer, network layer, transport layer, session layer, presentation layer, application layer) of the OSI reference model. However, it is also conceivable that the first layer structure has only some of the seven layers of the OSI reference model.

The input message can be divided into several packets.

The information piece is extracted by passing the input message through a protocol stack associated with the first layer structure from bottom to top. In this way, the input message is decoded layer by layer according to the protocol used for the respective layer, so that the decoded information piece is obtained as a result and thus extracted from the input message.

In particular, the information piece may be process information, especially from or for an OT hardware. In particular, the process information can be measurement and/or control data, machine status data, files (for example CNC programs or software updates), video and/or audio streams (for example from process monitoring cameras) or screen contents (for example from control screens of an OT hardware).

The extracted information piece is examined to obtain an examination result. In this way, the decoded data of the information piece can be examined directly, for example, for its conformity with a given requirement, for example, with regard to the format or value range and/or for its security.

The examination result may in particular contain information indicating whether an output message on the basis of the extracted information piece is to be generated and/or used. The examination result may also contain information indicating whether, and optionally how, an information piece is to be generated on the basis of the extracted information piece, on the basis of which generated information piece the output message is to be generated. For example, the examination result may contain information about a processing of the information piece to be performed, such as a formatting or conversion of process data contained in the information piece to generate a new information piece on the basis of which new information piece the output message is to be generated. The examination result may also contain information indicating whether and optionally which event output message is to be generated and sent. Such an event output message can, for example, inform a monitoring system about a negative examination result (e.g., information piece with malicious code or inadmissible content).

The examination, in particular access control, on application level may in particular decide on the basis of the process information provided by the extraction of the information piece, which actions are to be performed based on the process information in order to ensure the safety of the operating resources, in particular the safety of devices connected to the second communication network, such as production machines, and the safety of persons. In particular, the examination result may include a decision as to which actions are to be performed based on the process information.

The output message is generated by passing the extracted information piece or an information piece generated based on the extracted information piece through a second protocol stack from top to bottom. In this way, an output message is generated with a second layer structure associated with the second protocol stack.

The outgoing message can be sent divided into several packets.

The second layer structure has multiple layers according to the OSI reference model. In particular, the second layer structure may have all seven layers of the OSI reference model. However, it is also conceivable that the second layered structure has only some of the seven layers of the OSI reference model. Further, the first and second layer structures and/or the first and second protocol stacks may match. However, it is also conceivable that the second layer structure differs from the first layer structure and/or the first protocol stack differs from the second protocol stack. In this way, in particular, data can be exchanged between different types of communication networks in which different protocols are used.

The output message can be generated with the extracted information piece itself or with an information piece generated on the basis of the extracted information piece. Accordingly, in particular, processing of the extracted information piece may also be performed to generate the information piece generated on the basis of the extracted information piece, which may comprise, for example, formatting or conversion of the information piece.

The generation and/or sending of the output message are carried out as a function of the examination result. In particular, actions intended according to the examination, especially access control, can be implemented in this way.

For example, provision can be made that the output message is generated and/or sent only if the examination result is positive or contains corresponding information about this, respectively, for example if the examination has determined that the information piece is compliant with a specified requirement and/or is secure, for example does not contain malicious code.

Furthermore, it may be provided that an information piece is generated on the basis of the extracted information piece and that, in turn, the output message is generated on the basis of the generated information piece if the examination result contains corresponding information thereon.

It is also conceivable that, in the event of a negative examination result or if the examination result contains information about this, an event output message is generated and sent, in particular via the second interface. The event output message can, for example, contain information about the negative examination result. In this way, for example, a monitoring system of the network can be informed about a safety-relevant event, in particular the negative examination result.

By extracting the information piece from the input message and by examining it at the top layer, the data to be exchanged between the first and second networks is decoded so that the data of the communication between the two networks can be obtained and analyzed, in particular with regard to the relevant process information. In particular, the communication is decoded in this way in such a way that only the pure information with known system behavior is processed further, in particular examined and, as a function of the examination, sent or processed.

By extracting the pure information in the information piece and separately generating a corresponding output message, the communication between the two communication networks is broken into two separate channels, resulting in asynchronous communication, which increases security.

In addition, different protocols and fieldbus systems with different layer structures can be addressed in this way, so that secure and reliable communication between different networks is achieved.

Unlike the use of a firewall system, the establishment of a direct communication connection between systems located in different segments of the network infrastructure, in particular in the first and second communication network, is preferably not supported.

In particular, communication connections between an IT and an OT system are preferably established exclusively in a separated manner.

The steps of the previously described method concern communication from the first interface to the second interface or from the first communication network to the second communication network, respectively. Preferably, communication also takes place in the reverse direction. Accordingly, the device is preferably also configured for communication from the second interface to the first interface or from the second communication network to the first communication network, respectively. The communication in this reverse direction may also take place asynchronously, in particular with an examination of information pieces at the top layer, or, alternatively, synchronously and/or without examination of the information pieces at the top layer.

The output message generated and/or sent as a function of the examination result may in this way in particular be made available to different systems, for example as a function on its origin. Possible examples are: the provision of process information of a production or industrial plant for a control system for operational production processes connected to the first or second communication network, or the transmission of CNC programs to a corresponding machine connected to the first or second communication network.

Various embodiments of the apparatus, of the system and of the method are described in the following, the individual embodiments applying independently of one another in each case to the apparatus, to the system and to the method. Furthermore, the individual embodiments can be combined with each other as desired.

In a first embodiment, the generating and/or the sending of the output message is performed only in case of a positive examination result. In this way, forwarding of faulty or malicious information pieces to the second communication network can be prevented.

In a further embodiment, the examining of the extracted information piece comprises: examining the extracted information piece for malicious code. For example, examining the extracted information piece may be performed using an anti-virus scanner. Examining at the application level facilitates the detection of malicious code compared to examining logs of the layer stack of coded information. In this way, higher security of communication between communication networks can be achieved.

In particular, host-based anti-virus and firewall solutions may be provided for the apparatus or for the system to further protect the apparatus and/or the communication between the first and second communication networks. For example, a firewall may be integrated into the apparatus. Preferably, the examining, in particular access control, comprises defense functions for one or more of the following scenarios:

attempts to infiltrate malicious code (malware);
Denial of Service (DoS) attack;
data theft;
sabotage of machines;
illegitimate use of IT systems to attack other IT systems (zombies and bots).

In a further embodiment, the examining of the extracted information piece comprises: examining the extracted information piece for correspondence with an entry in a predetermined list of allowed information pieces and/or in a predetermined list of disallowed information pieces. In this way, the extracted information piece can be matched against a whitelist of permissible information pieces and/or against a blacklist of impermissible information pieces. The whitelist may, for example, specify permissible information formats or impermissible value ranges for the information piece. Correspondingly, the blacklist can specify, for example, impermissible information formats or permissible value ranges for the information piece. In this way, a very high level of security can be achieved when forwarding the information pieces.

In a further embodiment, the examination of the extracted information piece comprises: examining the extracted information piece for conformance to one or more predetermined data conformance requirements, in particular for a device connectable or connected to the second communication network. In this way, the examination can be adapted to installation-specific requirements, for example. For example, the data conformance requirements may include requirements about permissible control commands or permissible parameter settings for a device connected to the second communication network, such as a production machine. In this way, even before an output message is sent to the second communication network, in particular to the device connected to it, it can be ensured that the information piece does not contain any impermissible control commands or impermissible parameter settings that could interfere with or even damage the connected device.

The data conformity requirements may also include consistency checks and/or plausibility checks, for example by means of an access control that permits access to certain devices connected to the second communication network only under certain circumstances, by certain users and/or with a certain password or certificate. In this way, in particular, a consistency and/or plausibility check of the data to be communicated is made possible in terms of IT security and functional safety specific to machines and process controls. This allows an integrity check of the transmitted contents and data.

The predefinable data conformance requirements are preferably administrable or programmable, for example via an administration interface or level of the apparatus, so that they can be adapted as required. In particular, rules about data from actual connected machines can be created or adapted as needed in this way.

Preferably, machine information about the processes of the production machines, which may for example be connected to the second communication network, and their mode of operation is known and/or is stored on a memory of the device, in particular in the form of data conformance requirements, for the examination, in particular access control, on the application layer. In particular, this machine information can be entered or programmatically implemented specifically for a production machine type by an administrator by means of rules, namely data conformance requirements. The data conformance requirements can be used in particular to specify which actions (for example, generating and/or sending of an output message, generating and/or sending of an event output message) are performed on the basis of the machine information and the process information and which are not.

By means of the examination, in particular access control, process information can be accepted in this way, for example, and sent in the form of an output message or processed further, in particular translated or newly created from other process information, before an information piece generated on this basis is sent in the form of an output message. Since access control can be implemented individually for different data types, machine types and desired application, highly application-specific cases are also possible.

In a further embodiment, the examining of the extracted information piece comprises:

receiving a current data conformance requirement information via the second interface; and
examining the extracted information piece for conformance with a data conformance requirement associated with the received current data conformance requirement information.

In this way, the examination may be performed, in particular, depending on the current state of a device connected to the second communication network, for example a production machine. In particular, it is conceivable that the control commands or parameter ranges permitted for a device depend on the current state of the device. This can be taken into account by the present embodiment.

For example, the current data conformance requirement information may include the data conformance requirement itself, such as allowable control commands or value ranges. Further, the data conformance requirement information may also include information that enables determination of an associated data conformance requirement. For example, the data conformance requirement information may include information about a value of a state parameter of a device connected to the second communication network that can be used to determine the control commands or parameter range allowed for that state parameter value. For this purpose, information about a plurality of data conformance requirements for different values of one or more state parameters is preferably stored on a memory of the apparatus. In particular, a so-called virtual twin of one or more devices connected to the second communication network can be generated on the apparatus, in which the respective operating state of the device concerned is mapped, so that the information piece can be examined depending on the current state of the device concerned.

In particular, the current data conformance requirement can be received after sending a request for current data conformance requirement information, for example, for a current device state. Furthermore, it is conceivable that current data conformance requirement information is received at regular intervals, with which, for example, a virtual twin can be kept up-to-date.

In a further embodiment, the apparatus further comprises at least one data memory, and the at least one memory and the computer program code are further configured to cause, with the at least one processor, the apparatus to buffer the information piece or an information piece generated based on the extracted information piece on the data memory as a function of the examination result, wherein the generating of the output message comprises: generating the output message by passing the buffered information piece or an information piece generated based on the buffered information piece through a protocol stack associated with a second layer structure from top to bottom. In this way, the extracted information piece or an information piece generated based on the extracted information piece is first buffered after the examination. In this way, the sending of the output message can be decoupled in time from the reception of the input message. This facilitates, for example, the transmission of information into a second communication network with clocked information exchange. Furthermore, this enables a device connected to the second communication network to retrieve the relevant information piece or output message at a time that is more independent of the time at which the input message is received.

In a further embodiment, the data memory has a database structure and the buffering of the extracted information piece or of the information piece generated on the basis of the extracted information piece on the data memory is performed in the database structure. In this way, an ordered buffering of the extracted or generated information pieces is possible, which in particular facilitates a targeted retrieval of the information pieces from the second communication network. In this case, the examination preferably comprises a conformity check of the extracted information piece with the database structure. For example, the database structure may only permit certain data formats or data ranges, such as number ranges.

In a further embodiment, the at least one memory and the computer program code are further configured to cause, with the at least one processor, the apparatus to obtain an information request via the second interface, wherein obtaining, in particular generating, and/or sending the output message is performed in response to the obtaining of the information request. In this manner, it is enabled that a device in the second communication network fetches an information on demand, in particular at a time that may be independent of the time of receipt of the input message.

In a further embodiment, the apparatus further comprises a first data memory and a second data memory, and the at least one memory and the computer program code are further configured to cause, with the at least one processor, the apparatus to store the extracted information piece on the first data memory, wherein the examining of the extracted information piece comprises: examining the information piece stored on the first data memory to obtain an examination result, and the at least one memory and the computer program code are further configured to cause, with the at least one processor, the apparatus to store the extracted information piece or an information piece generated based on the extracted information piece on the second data storage as a function of the examination result. In this manner, the examination may also be performed more independently of the receipt of the input message, with the storing from the first data memory to the second data memory being performed after the examination. The first and second data memories may be provided as two physically separate data memories or, alternatively, as two separate data memory areas on one physical data memory.

In a further embodiment, the apparatus is configured to extract information pieces from input messages having different layer structures by passing the respective input message through a protocol stack associated with the respective layer structure from bottom to top.

In this way, the apparatus can support different protocols or protocol stacks on the input side, which increases the flexibility and compatibility of the apparatus. For example, protocols that may be considered are SMB, FTP, http for files, OPC-UA, fieldbus protocols for general data, RDP, VNC, SSH, Telnet for desktop data, for example screen contents.

The embodiment described above in particular enables process information to be extracted from different protocols and made available to a higher-level layer in a uniform interface. This enables fast and retroaction-free data conversion and transformation of process information.

In a further embodiment, the apparatus is configured to generate output messages having different layer structures by means of passing an information piece through a protocol stack associated with the respective layer structure from top to bottom. In this way, the apparatus can support different protocols or protocol stacks on the output side, thereby increasing the flexibility and compatibility of the device. For example, protocols that can be considered are SMB, FTP, HTTP(S) for files, OPC-UA, fieldbus protocols for general data, RDP, VNC, SSH, Telnet for desktop data, for example screen contents.

Due to the previously described embodiment, different protocols are also supported for the generation of the output message.

Preferably, the apparatus is configured to use exclusively encrypted protocols for the first and/or second interface. In particular, to ensure IT security for communication on the side of a global network infrastructure, for example connected to the Internet, such as, for example, the first communication network, which may in particular be an IT communication network, encrypted protocols are preferably used exclusively. Unencrypted services are preferably avoided or disabled on this side.

In a further embodiment, the method further comprises:

receiving a reverse direction input message via the second interface, the reverse direction input message having a third layer structure and including a reverse direction information piece associated with the top layer of the third layer structure, extracting the reverse direction information piece from the reverse direction input message by passing the reverse direction input message through a protocol stack associated with the third layer structure from bottom to top, examining the reverse direction information piece to obtain a reverse direction examination result, generating a reverse direction output message by passing the extracted reverse direction information piece or a reverse direction information piece generated based on the extracted reverse direction information piece through a protocol stack associated with a fourth layer structure from top to bottom; and sending the reverse direction output message via the first interface, wherein the obtaining and/or sending of the reverse direction output message is performed as a function of the reverse direction examination result.

In a corresponding embodiment of the apparatus, the at least one memory and the computer program code are further configured to cause, with the at least one processor, the apparatus further to perform the aforementioned method steps.

In this way, secure, asynchronous communication is also enabled from the second to the first interface or from the second to the first communication network, respectively. The third layer structure can correspond in particular to the second layer structure and the fourth layer structure can correspond in particular to the first layer structure.

In a further embodiment, the method further comprises:

generating an information piece based on the extracted information piece.

In a corresponding embodiment of the apparatus, the at least one memory and the computer program code are further configured to cause, with the at least one processor, the apparatus to perform the aforementioned method step.

By generating an information piece based on the extracted information piece and using this generated information piece to generate the output message, a processing of the information contained in the information piece, for example a processing of process data, can be carried out and the processed information can be sent to the second communication network. Thus, in particular, processing of the information pieces can already take place in the apparatus, for example formatting, conversion or the like.

In a further embodiment, the first communication network and/or the second communication network is an OT network. The examined and asynchronous communication ensured by the method or the apparatus is particularly advantageous for OT networks, since these can be more vulnerable to attack or more susceptible to interference due to a lower or outdated security architecture. The use of the method, apparatus or system is particularly advantageous if one of the communication networks, in particular the second communication network, is an OT network and another communication network, in particular the first communication network, is an IT network. The examined asynchronous communication from the first to the second communication network can protect devices, in particular production machines, in the OT network from attacks from the IT network, in particular if the latter are connected to the Internet.

In a further embodiment, a device, in particular a production machine, is connected to the second communication network and the examining of the extracted information piece comprises: examining the extracted information piece for conformance to a predetermined or obtained data conformance request for the device. In this way, information transmitted from the first to the second communication network can be examined specifically for the device, in particular the production machine, in the second communication network, so that this device can be protected from being disturbed or even damaged by incorrect or harmful information pieces, such as unacceptable control instructions or parameter values outside an acceptable range.

In a further embodiment, the apparatus is further configured for examining and automatically detecting a compromising based on unusual behavior of the machine control computers and incoming and outgoing communications. This examining for a comprimising may, for example, be part of the examinating of the extracted information piece. Unusual behaviors may include:

multiple unsuccessful attempts to access machine control computers and/or deviating system behavior, e.g. based on a state examination.

In a further embodiment, the apparatus is preferably configured to perform functions for ensuring functional safety in accordance with ISO 26262. These functions can be implemented in particular by evaluating the extracted information pieces, in particular process information contained therein.

In a further embodiment, the apparatus is preferably configured to detect attacks on the basis of the process information and optionally further additional information from the process of extracting the information piece, for example header information obtained, and to ward them off preferably by means of blocking third-party systems. In this way, the apparatus can be equipped with a so-called Intrusion Detection System (IDS) and preferably with a so-called Intrusion Prevention System (IPS). The detection and/or defense of attacks can in particular be part of the examining of the extracted information piece.

In a further embodiment, the apparatus is configured to establish connections that can address a user, for example, via email, push notification, or similar methods. Such notification to users, for example, can be used to inform system administrators about network attacks and/or inform machine maintainers about error behavior of their machines.

Such notification may be made, in particular, by the generating and/or the sending of an event output message.

Provision can be made to address different types of data separately by different variants of the examining, in particular access control, at the application layer. For this purpose, the apparatus may be configured to provide different services for the extracting of the information piece from the input message and/or for the generating of an output message. In particular, the different services may be configured to process input and/or output messages with different layer structures and associated protocol stacks.

For example, one or more file transfer services (such as SMB, FTP, HTTP) may be provided to transfer files by the apparatus. The extraction of the information piece, in particular of one or more files, enables the provision or connection of server services. The examining, in particular access control, at the application layer may include, for example, examining for viruses and other malware in addition to the examining for compliance with data conformance requirements. The generating of the output message can also be performed using file transfer services. File transfer can be operated with individual settings for each direction (from the first to the second and from the second to the first interface or from the IT network to the OT network or from the OT network to the IT network, respectively).

Furthermore, for example, one or more data transfer services can be provided, such as for a wide variety of protocols and/or fieldbus systems, such as for communication using OPC-UA. In this way, for example, any measurement data, process data and control data from or for production or industrial plants can be recorded. The generating of the output message may in particular comprise a processing of such data. This makes it possible, for example, to store the process information in a central enterprise database. In this way, data from OT devices can be examined by the apparatus and made available to the monitoring IT systems.

Further, for example, one or more services may be provided for the transmission of screen contents, which may support, for example, one or more of the following protocols: RDP, VNC, SSH, Telnet. Such a service can be used, for example, to connect to a control software, in particular an OT system in the second communication network. When examining the extracted information piece, it is preferably examined on the basis of an authorization concept, for example using login data, which actions may be performed, in particular which extracted information pieces are permitted or not.

The generating and sending of output messages can be done, for example, by providing a web interface of a web server of the apparatus so that a user can connect using a web browser. Similarly, other specific services for video and audio content, for example, can be implemented.

In one embodiment, process information is buffered on the apparatus. In this way, especially when using the apparatus with networks to which systems of a production or industrial plant are connected, it can be achieved that even in the event of a failure of the network infrastructure, the process information generated by the plant can be buffered on the device and made available to further production and industrial plants after the communication link is restored.

The apparatus can achieve standardization of the interface between systems of production and industrial equipment and information technology, since the logic implemented in the apparatus can analyze the data of the equipment and provide it in a defined format.

The apparatus also reduces the number of devices required, since instead of two separate devices for a firewall system and a conversion, only the apparatus is needed. Compared to a combination of firewall and converter, however, the examination performed at the top layer, in particular the application layer, in the apparatus enables greater security and much more far-reaching options, since, for example, process information provided can be accessed for examining the information pieces. In contrast, a firewall system has so far only allowed communication to be restricted to absolutely necessary protocols.

The system may comprise several of the previously described apparatuses or embodiments thereof, which are operated in parallel with each other. In this way, the availability of communication between the first and second communication networks can be increased so that, for example, high availability requirements can be met.

To improve availability, the apparatus can in particular be configured to take over a communication link if a device used in parallel fails. For this purpose, the apparatus is configured to act as an overall network with other apparatuses used in parallel, in particular to obtain information about the availability of the apparatuses used in parallel.

BRIEF DESCRIPTION OF THE DRAWINGS

Further advantages and features of the apparatus, the system and the method emerge from the following description of embodiments, wherein reference is made to the attached drawing.

In the Drawing

FIG. 1 shows a network system from the prior art,

DESCRIPTION OF THE INVENTION

Figure 2A:
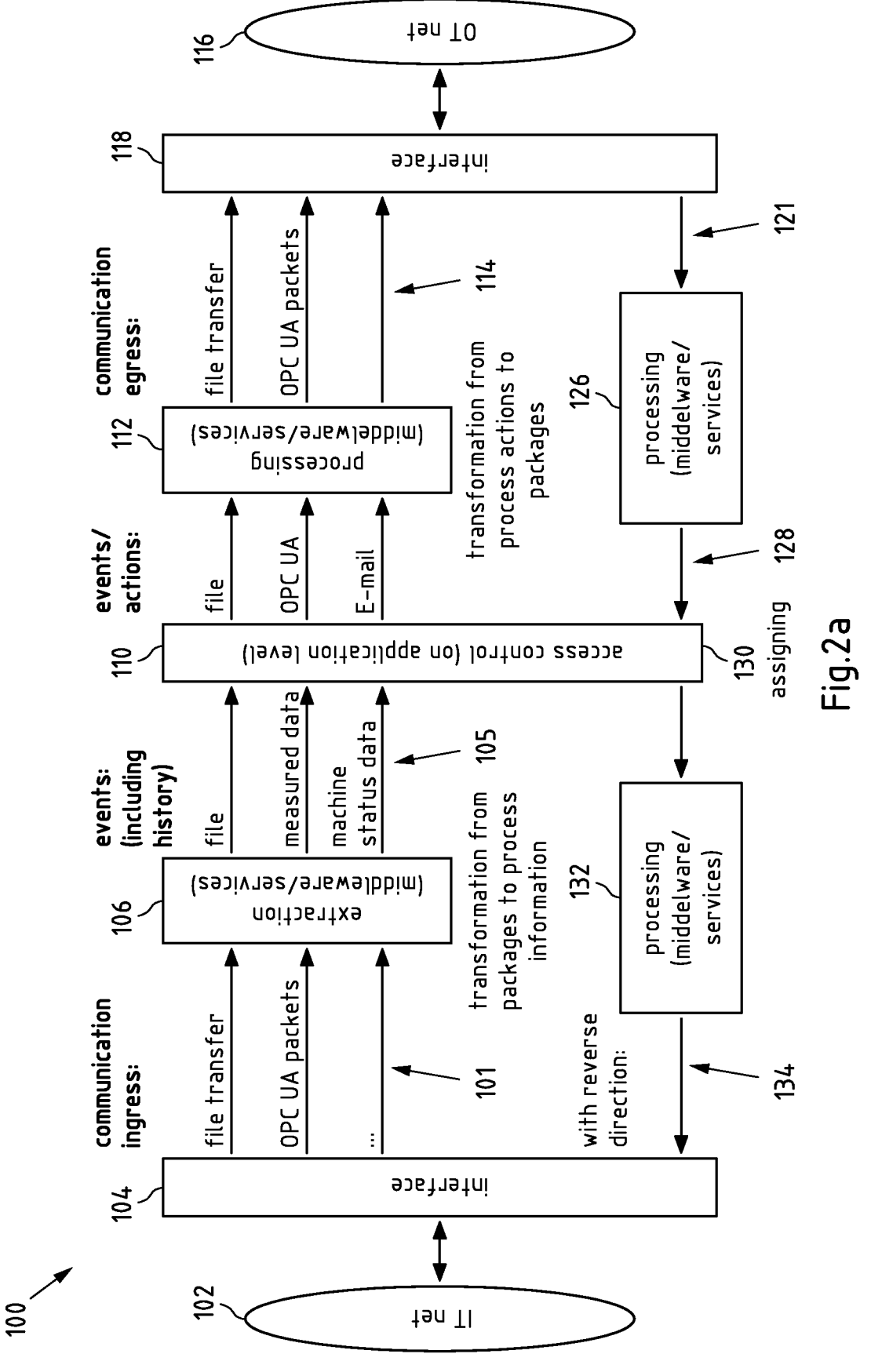
FIG. 2*a-c* show an exemplary embodiment of the method.

FIG. 1 shows a schematic representation of a prior art network system. The network system 2 comprises an IT network 4, a first OT network 6 and a second OT network 8. The IT network 4 is the internal office communications network of a company, which may be connected to the Internet 10, for example. The first and second OT networks 6, 8 are each communication networks via which various production machines are interconnected.

In the past, IT and OT networks, such as IT network 4 and OT network 6, were often separated from each other so that there was no communication link between the two networks. This was necessary, among other things, because OT networks 6 often used their own network protocols, some of them proprietary, which were not directly compatible with the typically Ethernet-based IT network. Although the network separation between the IT and OT networks resulted in a high level of security, since it was not possible to penetrate the OT network via the IT network, it also made the system inflexible, since it prevented any automatic exchange of data between the OT and IT networks, so that, for example, central control or monitoring via the IT network was not possible.

In particular, with the increasing use of Ethernet technology for OT networks and increasing digitization, the OT systems of a production or industrial plant, which were once operated in complete isolation, are now increasingly being integrated into the global network infrastructures of the IT systems, as shown in FIG. 1 for the OT network 8, which is connected to the IT network 4.

The integration of the systems into the network infrastructures significantly changes the threat situation with regard to an impairment of the secure and continuous operation as well as the guarantee of the defined protection goals due to the often used outdated software and hardware. Primarily, the change in the threat situation can be explained by the coincidence of outdated software or hardware with already known vulnerabilities and the multitude of heterogeneous systems connected to the Internet, which pose a potential threat to the OT systems. The integration of OT systems that were once operated in isolation thus creates an extensive risk for the operating organization.

However, minimizing the risk by holistically updating the software and hardware used and thus eliminating the known vulnerabilities is not possible due to the often advanced age of the production and industrial equipment or the restrictions imposed by the manufacturer, so that at the current time the only options are to isolate the systems in the global network infrastructure with the aid of a firewall system 12 or to physically separate them completely again—like the OT network 6. In either case, the possibilities with regard to optimizing operational production processes are restricted and it is more difficult to take advantage of the opportunities that arise.

The state of the art with regard to securing OT systems that have been integrated into the global network infrastructures of the IT systems is thus primarily based on logical separation through the use of firewall systems 12, so that operation of the OT systems of a production or industrial plant is enabled in a dedicated segment. However, the integration of the production or industrial plants into the network infrastructure of the IT systems does not enable data exchange (e.g., process data, quality data and energy data) in every case, since different hardware and software versions and incompatible proprietary protocols are used. To solve this problem, converters are increasingly being used which convert proprietary OT protocols and enable communication with IT systems. However, such converters do not solve the security problem for OT networks satisfactorily.

Figures 2B, 2C:
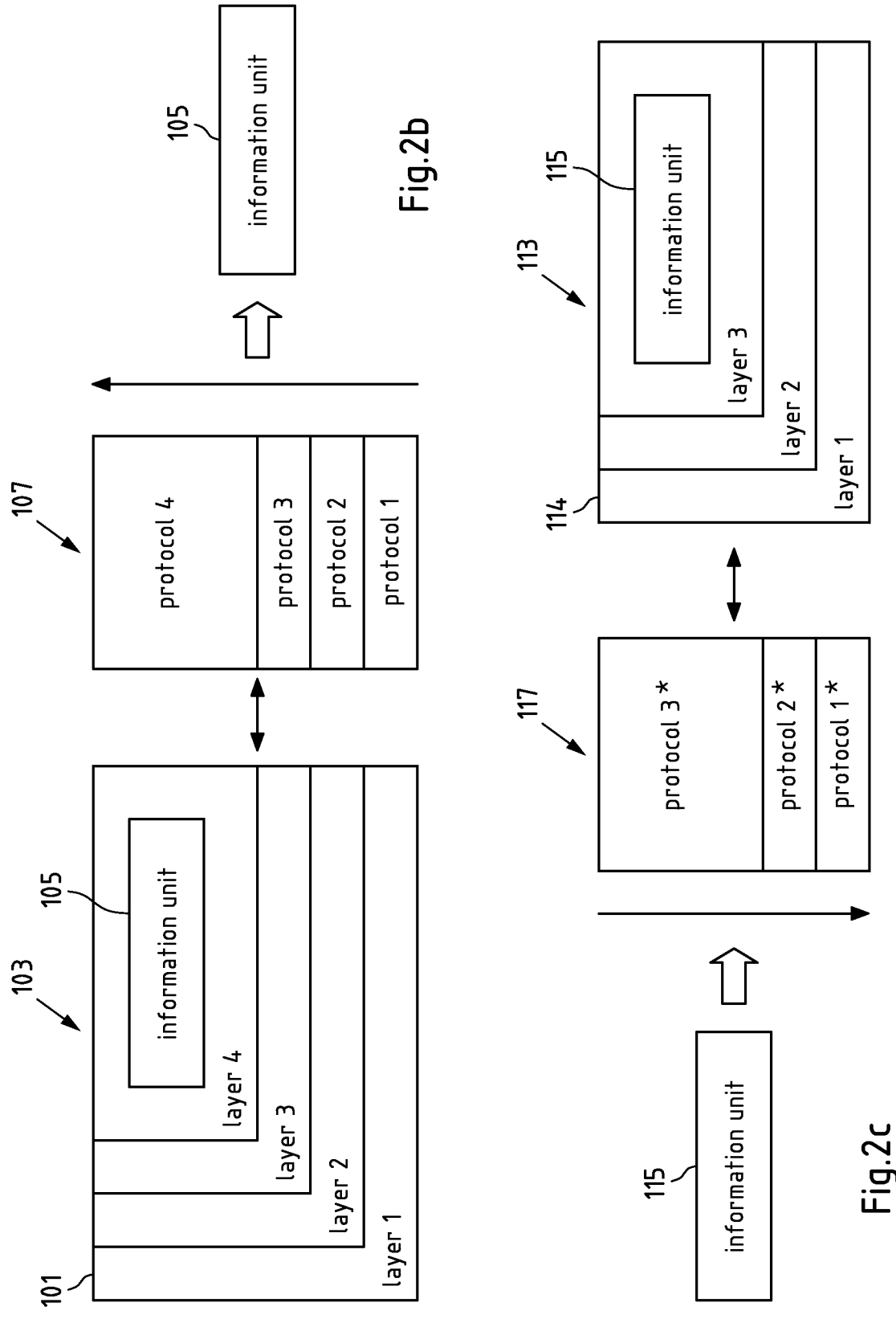

FIGS. 2a-c show a schematic representation of an exemplary embodiment of the method according to the present disclosure.

In the method 100 (see FIG. 2a), an input message 101 is first received via a first interface 104 connected to a first communication network 102. The input message 101 has a first layer structure 103, exemplified by four layers shown in FIG. 2b. The input message 101 includes an information piece 105 associated with the top layer ("layer 4" in FIG. 2b) of the first layer structure 103. For example, the input message 101 may have a layer structure for a file transfer, for example FTP in a TCP/IP protocol stack, or a layer structure according to the OPC Unified Architecture (OPC UA) standard.

The information piece 105 may be, for example, process information, particularly measurement and/or control data, machine status data, files (for example, CNC programs or software updates), video and/or audio streams (for example, from process monitoring cameras), or screen content (for example, from control screens of OT hardware).

The received input message 101 is then decoded (step 106) to extract the information piece 105 from the input message 101. For this purpose, in step 106 a protocol stack 107 assigned to the first layer structure 105 is passed-through from bottom to top, so that the respective protocols are processed from the lowest layer to the top layer (in particular application layer) and finally the information piece 105 assigned to the top layer, i.e. the pure information, in particular process information, is obtained.

In the example shown in FIG. 2b, the input message 101, when passing through the protocol stack 107 from bottom to top, is processed, for example, first according to "Protocol 1" of the protocol stack 107 to process "Layer 1", then processed according to "Protocol 2" of the protocol stack 107 to process "Layer 2", then processed according to "Protocol 3" of protocol stack 107 to process "Layer 3" and finally processed according to "Protocol 4" of protocol stack 107 to process "Layer 4" and thus extract the information piece 105 associated with this "Layer 4", which in the present case represents the top layer of the layer structure.

The extracted information piece 105 may be, for example, a file, measurement data, machine status data, control data, or the like.

In the next step 110, the extracted information piece 105 is examined to obtain an examination result. If the information piece is, for example, a file, a virus scan of the file, the result of which represents the examination result, may for example be performed during examination. If the information piece is, for example, measurement data or machine status data, it may be examined whether this data is within a predefined, permissible range of values or has the correct format during examination. If the information piece 105 is, for example, control commands, a blacklist or whitelist can be used, for example, to examine whether the control commands are permissible.

If the examination result is positive, i.e., for example, the file does not contain a virus, the measurement data or machine status data are within permissible ranges or are correctly formatted, or the control commands are permissible, respectively, an output message 114 is generated in the next step 112 by passing the extracted information piece from top to bottom through a protocol stack 117 associated with a second layer structure 113, so that the respective protocols are processed from the top layer (in particular, application layer) to the bottom layer, and finally the final encoded output message is obtained.

Alternatively, the extracted information piece 105 may be processed first, for example reformatted, converted, or the like, and then the output message may be generated using the information piece obtained by such processing.

FIG. 2c schematically shows the generation of the output message 114 from an information piece 115, which may be the extracted information piece 105 or an information piece obtained based on the extracted information piece 105. The information piece 115 passes through the second protocol stack 117 from top to bottom, wherein the information piece 115 is, for example, first processed according to "protocol 3*" to embed the information piece 115 in the top layer of the layered structure 113 ("layer 3"), which is then processed according to "protocol 2*" to further embed the information piece 115 embedded in the "layer 3" in the "layer 2", and then processed according to "protocol 1*" for embedding in the "layer 1", thereby generating the output message 113.

In this example, the second layered structure 117 has a different number of layers than the first layered structure 107, exemplarily three layers. The number of layers of the first and second layered structures 107, 117 may also be the same. Further, the protocols used in the protocol stacks 107 and 117 differ from each other. However, the same protocols may be used in the protocol stacks 107 and 117.

The generated output message 114 is then sent, again if the examination result is positive, via a second interface 118 connected to a second communication network 116 (see FIG. 2a).

In this way, a verified and asynchronous communication connection is provided between the first communication network 102, which may be an IT network, for example, and the second communication network 116, which may be an OT network, in particular. In particular, this method can prevent information pieces with unauthorized content or malicious code from entering the second communication network 116 from the first communication network 102, which may be connected to the Internet, for example, and from disrupting or damaging the connected production machines there.

The method may also involve a communication connection from the second communication network 116 to the communication network 102. This communication in the reverse direction may be analogous to the examined, asynchronous communication described above, in which an input message 121 is received via the second interface 118, the information piece 128 associated with the top level of the layer structure of the input message 121 is extracted in step 126, the information piece 128 is examined in step 130, and depending on the examination result, an output message 134 is generated in step 132 and sent via the first interface 104. Alternatively, however, a conventional direct communication connection may be provided in the reverse direction.

Figure 3:
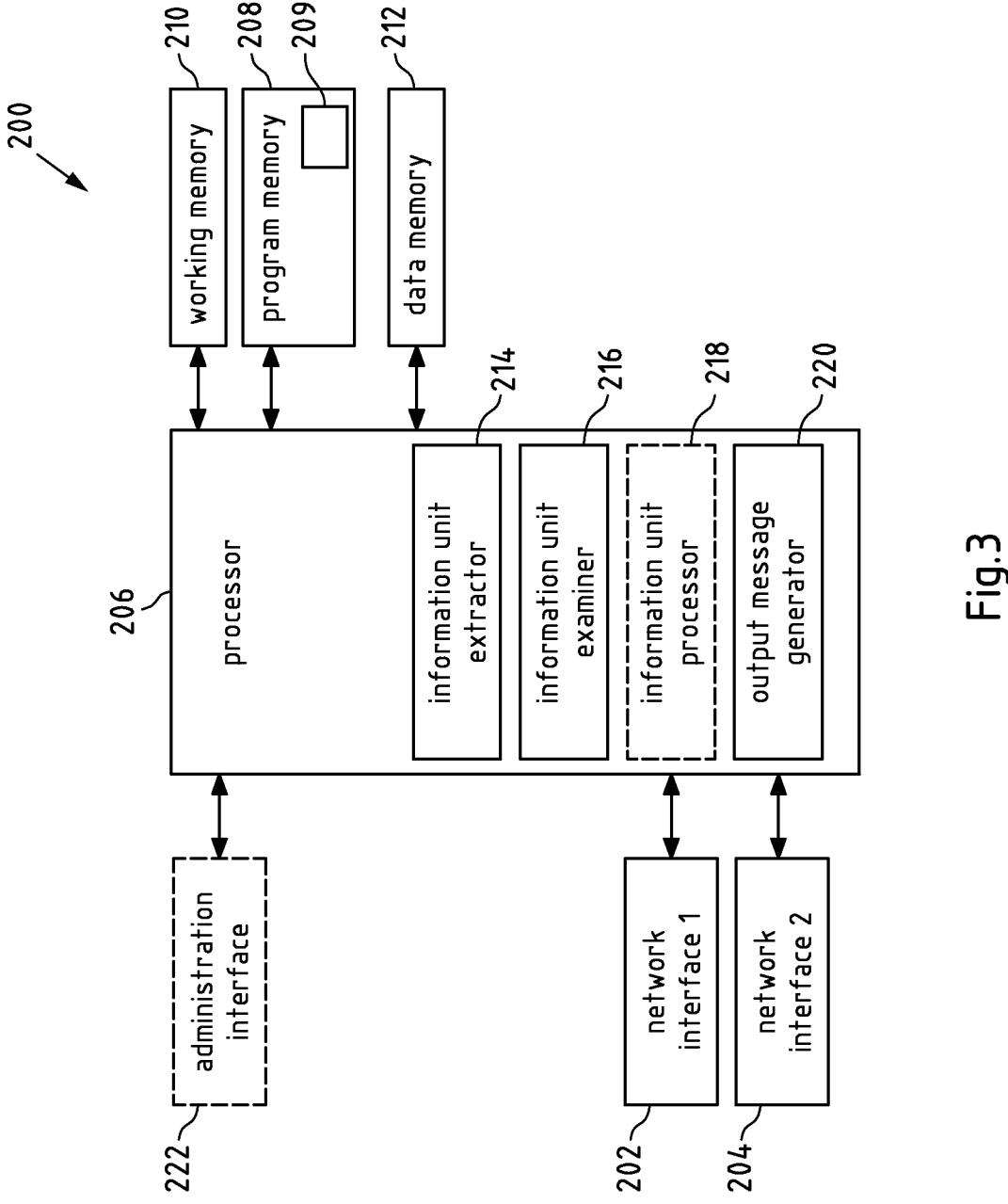
FIG. 3 show an exemplary embodiment of the device.

FIG. 3 shows, in a schematic view, an exemplary embodiment of the apparatus according to the present disclosure. The apparatus 200 comprises a first interface 202 for communication with a first communication network, a second interface 204 for communication with a second communication network separate from the first communication network, at least one processor 206, a program memory 208 containing computer program code 209, and preferably further comprising a main memory 210 and a data memory 212.

The computer program code 209 stored on the program memory 208 is configured to cause, with the at least one processor 206, the apparatus 200 to perform the method 100 illustrated in FIG. 2.

To this end, the processor 206 may include, for example as a functional or structural unit, an information piece extractor 214 that may be configured, in particular, to extract from an input message received via the first interface 202 an information piece associated with the top layer of a first layer structure of the input message by passing the input message from bottom to top through a protocol stack associated with the first layer structure.

Further, the processor 206 may include, for example as a functional or structural unit, an information piece examination unit 216 that may be particularly configured to examine an information piece extracted by the information piece extractor 214 to obtain an examination result. In particular, the examination may be performed based on data conformance requirements that the information piece examination unit 216 may retrieve, for example, from the data memory 212.

Further, the processor 206 may include, for example as a functional or structural unit, an optional information piece processor 218 that may be particularly configured to generate an information piece based on an information piece extracted by the information piece extractor 214, for example when an examination result obtained by the information piece examination unit 216 is positive.

Further, the processor 206 may include, for example as a functional or structural unit, an output message generator 220 that may be particularly configured to generate an output message from an information piece extracted by the information piece extractor 214 or from an information piece generated by the information piece processor 218 by passing through a protocol stack associated with a second layer structure from top to bottom.

The apparatus 200 may further include an administration interface 222, for example a user interface, through which the device may be configured or administered. For example, the administration interface 222 may be used to configure specifications for the examination to be performed by the information piece examination unit 216, for example by storing data conformance requirements specified for the examination on the data memory 212.

Figure 4:
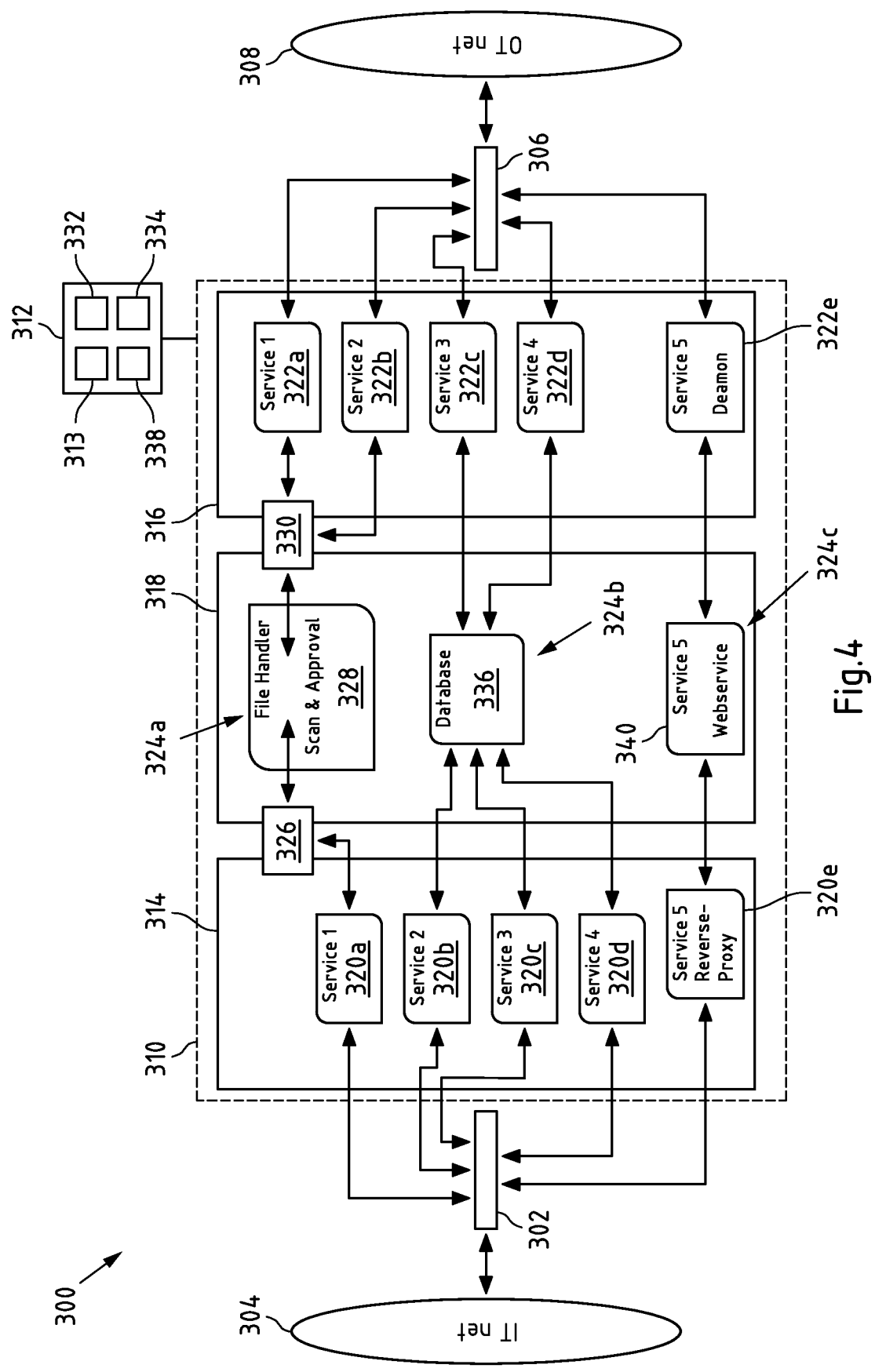
FIG. 4 show further exemplary embodiments of the apparatus and the method.

FIG. 4 shows, in a schematic view, further exemplary embodiments of the apparatus and method according to the present disclosure.

The apparatus 300 includes a first interface 302 for communicating with a first communication network 304, a second interface 306 for communicating with a second communication network 308 separate from the first communication network 304, a processor 310, and a memory 312 containing computer program code 313.

The memory 312 and computer program code 313 are configured to cause, with the processor 310, the apparatus to perform the following steps (a) through (e):

(a) Receiving an input message via the first interface 302, the input message having a first layer structure and containing an information piece associated with the top layer of the first layer structure;

(b) Extracting the information piece from the input message by passing the input message through a protocol stack associated with the first layer structure from bottom to top;

(c) Examining the extracted information piece to obtain a examination result;

(d) Generating an output message by passing the extracted information piece or an information piece generated on the basis of the extracted information piece through a protocol stack associated with a second layer structure from top to bottom;

(e) Sending the output message via the second interface 306.

To perform steps (a) through (e), the processor 310 may include, for example as functional or structural units, a first decoding/processing unit 314, a second decoding/processing unit 316, and an examination unit 318.

The first decoding/processing unit 314 provides various services 320a-e that are configured, for example, to process input messages received via the first interface 302 having different layer structures and associated protocol stacks in order to extract a unit of information associated with the top layer of the layer structure of the input message and forward it to the examination unit 318. In addition, the services 320a-e may be configured to generate output messages with different layer structures and associated protocol stacks from information pieces received from the examination unit 318 and send them via the first interface 302.

For example, services 320a and 320b may be configured to decode input messages and/or generate output messages using an FTP/TCP/IP layered structure, service 320c may be configured to decode input messages and/or generate output messages using an OPC-UA/TCP/IP layered structure, and services 320d and 320e may be configured to decode input messages and/or generate output messages using an HTTP/TCP/IP layered structure.

The second decoding/processing unit 316 provides various services 322a-e that are configured, for example, to process input messages received via the second interface 306 having different layer structures and associated protocol stacks in order to extract a information piece associated with the top layer of the layer structure of the input message and forward it to the examination unit 318. In addition, the services 322a-e may be configured to generate output messages having different layer structures and associated protocol stacks from information pieces received from the examination unit 318 and send them via the second interface 306.

For example, the services 322a and 322c may be configured for decoding input messages and/or generating output messages with an OPC-UA/TCP/IP layer structure, the service 322b may be configured for decoding input messages and/or generating output messages with an FTP/TCP/IP layer structure, the service 322d may be configured for decoding input messages and/or for generating output messages with a proprietary OT layer structure and the service 320e may be configured for decoding input messages and/or generating output messages with a HTTP/TCP/IP layer structure, etc.

The examination unit 318 provides various examination services 324a-c.

For example, the examination services 324a-c may be arranged to examine an information piece received from the first decoding/processing unit 314 to obtain an examination result, and to forward the information piece to the second decoding/processing unit 316 depending on the examination result. The examination unit 318 may be further configured to generate an information piece based on the information piece received from the first decoding/processing unit 314, and to forward the information piece to the second decoding/processing unit 316 depending on the examination result.

For example, the examination services 324a-c may also be arranged to examine an information piece received from the second decoding/processing unit 316 to obtain an examination result, and to forward the information piece to the first decoding/processing unit 314 depending on the examination result. The examination unit 318 may be further configured to generate an information piece based on the information piece received from the second decoding/processing unit 316, and to forward the information piece to the second decoding/processing unit 314 depending on the examination result.

The first examination service 324a includes a first buffer memory module 326, an examination module 328, and a second buffer memory module 330.

The first buffer memory module 326 is configured to buffer an information piece received from the first decoding/processing unit 316 on a first data memory 332. The first data store 332 may be, for example, a predetermined memory area in the memory 312.

The examination module 328 is configured to examine an information piece buffered in the first data memory 332, for example, to scan for malicious code or to examine the conformance of the information piece with predetermined data conformance requirements, and to cause the second buffer memory module 330 to buffer the information piece on a second data memory 334 if the examination result is positive (no malicious code; compliant). The second data memory 334 may be, for example, another predetermined memory area in the memory 312.

The second buffer memory module 330 is further configured to forward an information piece buffered in the second data memory 334 to the second decoding/processing unit 314, for example upon receipt of a corresponding request via the second interface 306.

The second examination service 324b includes a database access module 336 configured, for example, to examine an information piece received from the first decoding/processing unit 314 for conformance with a database structure of a database 338, for example, that may be stored in the memory 312. For example, the database access module 336 may examine whether the information piece has a format, such as number format, that conforms to the database. The database access module 336 is further configured, for example, to store the information piece in the database 338 if the examination result is positive (information piece is database compliant).

The database access module 336 is further configured to forward an information piece stored in the database 338 to the second decoding/processing unit 314, for example, upon receipt of a corresponding request via the second interface 306.

The third examination service 324c includes a web service module 340 configured, for example, to examine an information piece received from the second decoding/processing unit 316 and, if the examination result is positive, to forward the information piece to the first decoding/processing unit 314.

Figure 5:
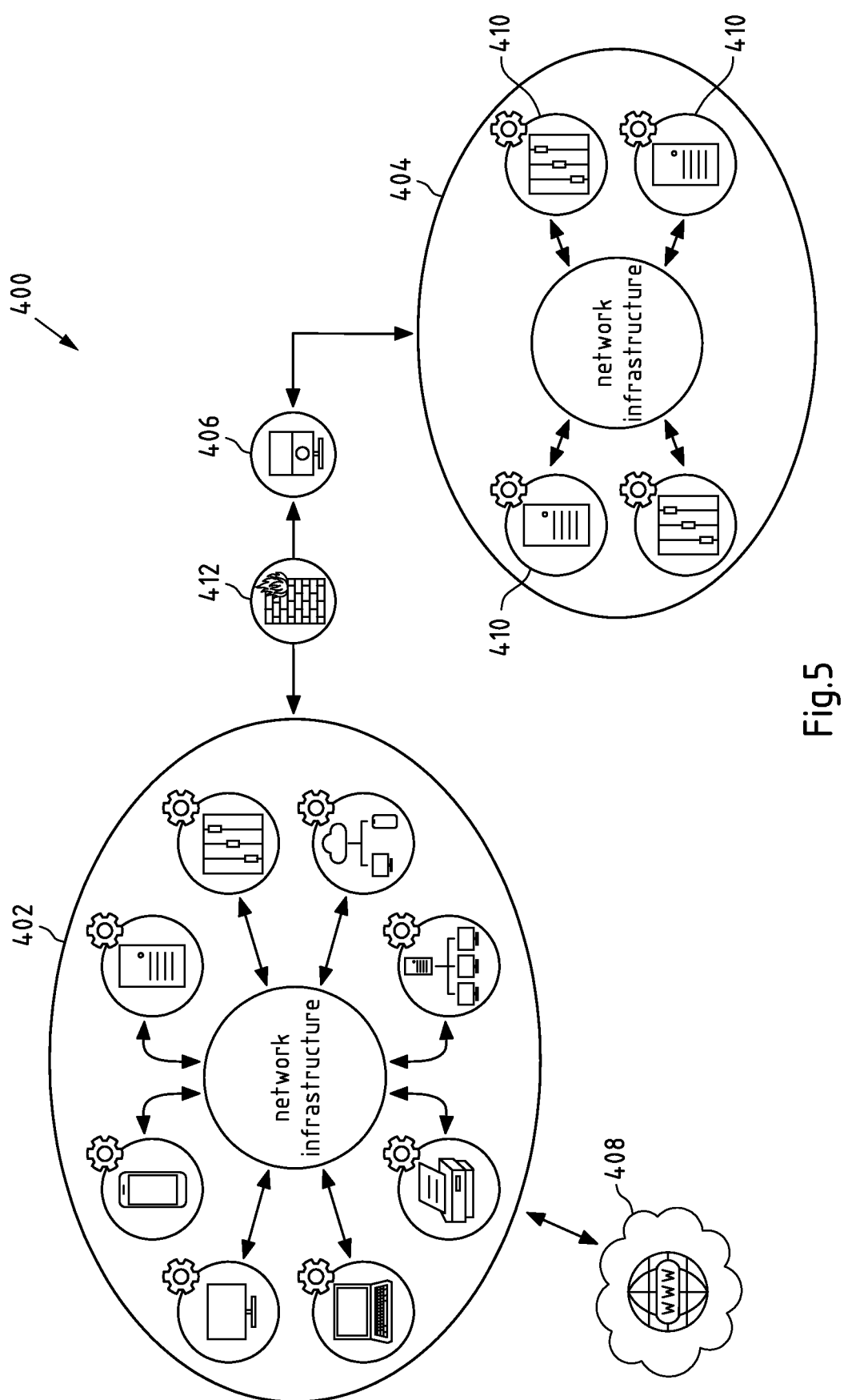
FIG. 5 shows an exemplary embodiment of the system.

FIG. 5 shows, in schematic view, an exemplary embodiment of the system according to the present disclosure.

The system 400 includes a first communication network 402, a second communication network 404, and an apparatus 406 that may be configured like the apparatus 200 of FIG. 3 or like the apparatus 300 of FIG. 4.

The first communication network 402 may be, for example, an IT communication network that may be connected to the Internet 408. The second communication network 402 may be, for example, an OT communication network to which various production machines 410 are connected.

The first and second communication networks 402, 404 are separate from each other. Communication between the first and second communication networks 402, 404 is only possible via the apparatus 406, wherein the first communication network 402 is connected to the first interface and the second communication network 404 is connected to the second interface of the device 406.

The verified and asynchronous communication between the first and second communication networks 402, 404 achieved via the apparatus 406 can minimize security risks, particularly for the OT communication network 402 and the production machines 410 connected thereto. In particular, the apparatus 406 can be used to prevent cyber attacks from the IT communication network 402 into the OT communication network 404, since the apparatus 406 prevents direct communication connections between members of both networks and instead only allows asynchronous and mutually separated communication connections to the apparatus 406 with an examination of transmitted data at the top layer, in particular application layer.

To this end, the apparatus 406 may, for example, map a "digital twin" of one or more of the production machines 410 by storing in the apparatus 406 information about the current operating state of the production machines 410 so that the examination of the data to be transmitted from the IT network 402 to the OT network 404 may be performed depending on the current operating state of the respective production machine 410.

Through the apparatus 406, for example, files and operational data can be transferred in a secure manner between the communication networks 402, 404. Furthermore, the apparatus 406 also allows secure remote access from the IT network 402 to the production machines 410, in particular when control commands or parameters sent from the IT network 402 are examined for their permissibility by the device 406 using a "digital twin" of the production machine concerned.

For further protection, in addition to the apparatus 406, a further firewall 412 may be provided, for example, to prevent cyber attacks on the apparatus 406 itself. Additionally or alternatively, a firewall may be directly integrated into the apparatus 406.

The following embodiments shall also be deemed disclosed:

Embodiment 1

A method, performed by at least one device, in particular the apparatus described above or an embodiment thereof, comprising at least the following steps:

receiving an input message via a first interface connected to a first communication network, the input message having a first layer structure and containing an information piece associated with the top layer of the first layer structure, extracting the information piece from the input message by passing the input message through a protocol stack associated with the first layer structure from bottom to top, examining the extracted information piece to obtain an examination result, generating an output message by passing the extracted information piece or an information piece generated based on the extracted information piece through a protocol stack associated with a second layer structure from top to bottom; and sending the output message via a second interface connected to a second communication network separate from the first communication network, where the obtaining, in particular the generating, and/or sending of the output message is performed depending on the examination result.

Embodiment 2

The method according to embodiment 1, wherein the generating and/or sending the output message is performed only in case of a positive examination result.

Embodiment 3

The method according to embodiment 1 or 2, wherein the examining of the extracted information piece comprises:

examining the extracted information piece for malicious code.

Embodiment 4

The method according to any one of embodiments 1 to 3, wherein the examining of the extracted information piece comprises:

examining the extracted information piece for correspondence with an entry in a predetermined list of allowed information pieces and/or in a predetermined list of disallowed information pieces.

Embodiment 5

The method according to any one of embodiments 1 to 4, wherein the examining of the extracted information piece comprises:

examining the extracted information piece for conformance to one or more predetermined data conformance requirements, particularly for a device connectable to the second communication network.

Embodiment 6

The method according to any one of embodiments 1 to 5, wherein the examining of the extracted information piece comprises:

receiving a current data conformance requirement information via the second interface; and examining the extracted information piece for conformance with a data conformance requirement associated with the received current data conformance requirement information.

Embodiment 7

The method according to any one of embodiments 1 to 6, further comprising:

buffering the information piece or an information piece generated based on the extracted information piece on a data memory depending on the examination result, and wherein the generating of the output message comprises:

generating the output message by passing the buffered information piece or an information piece generated based on the buffered information piece through a protocol stack associated with a second layer structure from top to bottom.

Embodiment 8

The method according to embodiments 7, wherein buffering the extracted information piece or the information piece generated based on the extracted information piece on the data memory is performed in a database structure.

Embodiment 9

The method according to any one of embodiments 1 to 8, further comprising:

obtaining an information request via the second interface, and in which the obtaining, in particular the generating, and/or the sending of the output message are performed in response to the obtaining of the information request.

Embodiment 10

The method according to any one of embodiments 1 to 9, further comprising:

storing the extracted information piece on a first data memory, wherein the examining of the extracted information piece comprises:

examining the information piece stored on the first data memory to obtain an examination result, wherein the method further comprises:

storing the extracted information piece or an information piece generated on the basis of the extracted information piece on a second data memory depending on the examination result.

Embodiment 11

The method according to any one of embodiments 1 to 10, further comprising:

receiving a reverse direction input message via the second interface, the reverse direction input message having a third layer structure and contains a reverse direction information piece associated with the top layer of the third layer structure, extracting the reverse direction information piece from the reverse direction input message by passing the reverse direction input message through a protocol stack associated with the third layer structure from bottom to top, examining the extracted reverse direction information piece to obtain a revers direction examination result, generating a reverse direction output message by passing the extracted reverse direction information piece or a reverse direction information piece generated based on the extracted reverse direction information piece through a protocol stack associated with a fourth layer structure from top to bottom; and sending the reverse direction output message via the first interface, wherein the obtaining, in particular the generating, and/or the sending of the reverse direction output message is performed as a function of the reverse direction examination result.

Embodiment 12

The method according to any one of embodiments 1 to 11, further comprising:

generating an information piece based on the extracted information piece.

The invention claimed is:

1. An apparatus comprising:

a first interface for communicating with a first communication network, a second interface for communicating with a second communication network separate from the first communication network, at least one processor, at least one memory containing computer program code and at least one data memory, wherein the at least one memory and the computer program code are configured to cause, with the at least one processor, the device to perform at least the following:

receiving an input message via the first interface, the input message having a first layer structure and containing an information piece associated with the top layer of the first layer structure, extracting the information piece from the input message by passing the input message through a protocol stack associated with the first layer structure from bottom to top, examining the extracted information piece to obtain an examination result, buffering the information piece or an information piece generated based on the extracted information piece on the data memory as a function of the examination result, generating an output message by passing the buffered information piece or an information piece generated on the basis of the buffered information piece through a protocol stack associated with a second layer structure from top to bottom;

obtaining an information request via the second interface and sending the output message via the second interface, wherein the generating and/or the sending of the output message are performed as a function of the examination result and wherein the sending of the output message is performed in response to the obtaining of the information request.

2. The apparatus according to claim 1, wherein the generating and/or the sending of the output message is performed only in case of a positive examination result.

3. The apparatus according to claim 1, wherein the examining of the extracted information piece comprises:

examining the extracted information piece for malicious code.

4. The apparatus according to claim 1, wherein the examining of the extracted information piece comprises:

examining the extracted information piece for correspondence with an entry in a predetermined list of allowed information pieces and/or in a predetermined list of disallowed information pieces.

5. The apparatus according to claim 1, wherein the examining of the extracted information piece comprises:

examining the extracted information piece for conformance to one or more predetermined data conformance requirements, in particular for a device connectable to the second communication network.

6. The apparatus according to claim 1, wherein the examining of the extracted information piece comprises:

receiving a current data conformance requirement information via the second interface; and examining the extracted information piece for conformance with a data conformance requirement associated with the received current data conformance requirement information.

7. The apparatus according to claim 1, wherein the data memory has a database structure and the buffering of the extracted information piece or of the information piece generated on the basis of the extracted information piece on the data memory is performed in the database structure.

8. The apparatus according to claim 1, further comprising a first data memory and a second data memory, wherein the apparatus is further caused to store the extracted information piece on the first data memory, wherein the examining of the extracted information piece comprises:

examining the information piece stored on the first data memory device to obtain an examination result, wherein the apparatus is further caused to store the extracted information piece or an information piece generated based on the extracted information piece on the second data memory as a function of the examination result.

9. The apparatus according to claim 1, wherein the apparatus is configured to extract information pieces from input messages having different layer structures by passing the respective input message through a protocol stack associated with the respective layer structure from bottom to top.

10. The apparatus according to claim 1, wherein the apparatus is configured to generate output messages having different layer structures by means of passing an information piece through a protocol stack associated with the respective layer structure from top to bottom.

11. The apparatus according to claim 1, wherein the apparatus is further caused to perform the following:

receiving a reverse direction input message via the second interface, wherein the reverse direction input message has a third layer structure and contains a reverse direction information piece associated with the top layer of the third layer structure, extracting the reverse direction information piece from the reverse direction input message by passing the reverse direction input message through a protocol stack associated with the third layer structure from bottom to top, examining the extracted reverse direction information piece to obtain a reverse direction examination result, generating a reverse direction output message by passing the extracted reverse direction information piece or a reverse direction information piece generated based on the extracted reverse direction information piece through a protocol stack associated with a fourth layer structure from top to bottom; and sending the reverse direction output message via the first interface, wherein the generating and/or the sending of the reverse direction output message is performed as a function of the reverse direction examination result.

12. The apparatus according to claim 1, wherein the apparatus is further caused to perform the following:

generating an information piece based on the extracted information piece.

13. A system, with a first communication network, with a second communication network separate from the first communication network; and with an apparatus according to claim 1, wherein the first interface is connected to the first communication network and the second interface is connected to the second communication network.

14. The system according to claim 13, wherein the first communication network and/or the second communication network is an operational technology network.

15. The system according to claim 13, wherein a device, in particular a production machine, is connected to the second communication network, and wherein the examining of the extracted information piece comprises:

examining the extracted information piece for conformance to a predetermined or obtained data conformance requirement for the device.

16. A method, performed by at least one apparatus, in particular an apparatus according to claim 1, the method comprising at least the following steps:

receiving an input message via a first interface connected to a first communication network, wherein the input message has a first layer structure and contains an information piece associated with the top layer of the first layer structure, extracting the information piece from the input message by passing the input message through a protocol stack associated with the first layer structure from bottom to top, examining the extracted information piece to obtain an examination result, buffering the information piece or an information piece generated based on the extracted information piece on the data memory as a function of the examination result, generating an output message by passing the buffered information piece or an information piece generated based on the buffered information piece through a protocol stack associated with a second layer structure from top to bottom, obtaining an information request via the second interface and sending the output message via a second interface connected to a second communication network separate from the first communication network, wherein the generating and/or the sending of the output message are performed as a function of the examination result and wherein the sending of the output message is performed in response to the obtaining of the information request.

17. Computer program code, which, when executed by the apparatus of claim 1, causes said apparatus to carry out the method according to claim 16.

\* \* \* \* \*